United States Patent
Nair et al.

(10) Patent No.: US 9,240,816 B2
(45) Date of Patent: Jan. 19, 2016

(54) TIMING SYNCHRONIZATION SYSTEM AND METHOD OF SUPER REGENERATIVE RECEIVER BASED ON ULTRA LOW POWER COMMUNICATION

(71) Applicant: Samsung Electronics Co., Ltd., Suwon-si (KR)

(72) Inventors: Jinesh Parameshwaran Nair, Bangalore (IN); Kiran Bynam, Bangalore (IN); Manoj Choudhary, Bangalore (IN); Pradeep Dwarakanath, Bangalore (IN); Youngjun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/455,517

(22) Filed: Aug. 8, 2014

(65) Prior Publication Data
US 2015/0043696 A1 Feb. 12, 2015

(30) Foreign Application Priority Data
Aug. 9, 2013 (IN) .......................... 3564/CHE/2013
May 14, 2014 (KR) ........................ 10-2014-0057951

(51) Int. Cl.
H04L 7/06 (2006.01)
H04B 1/30 (2006.01)
H04L 7/04 (2006.01)
H04L 25/00 (2006.01)

(52) U.S. Cl.
CPC ........ *H04B 1/30* (2013.01); *H04L 7/041* (2013.01); *H04L 25/00* (2013.01)

(58) Field of Classification Search
CPC ...... H04B 1/7183; H04B 7/2125; H04B 1/06; H03D 11/00; H04L 7/06
USPC ......... 375/364, 138, 147, 150, 260, 267, 329, 375/343; 370/203, 350, 392, 431
See application file for complete search history.

(56) References Cited

U.S. PATENT DOCUMENTS

| | | | |
|---|---|---|---|
| 7,206,335 B2 | 4/2007 | Bultan et al. | |
| 7,974,262 B2 | 7/2011 | Fatemi-Ghomi et al. | |
| 2010/0150219 A1 | 6/2010 | Oh et al. | |
| 2011/0032974 A1* | 2/2011 | Karino | 375/142 |
| 2011/0274141 A1* | 11/2011 | Jantunen et al. | 375/138 |
| 2012/0307839 A1* | 12/2012 | Ionescu et al. | 370/431 |
| 2013/0114645 A1* | 5/2013 | Huang et al. | 375/147 |
| 2014/0010326 A1* | 1/2014 | Chari | 375/285 |

FOREIGN PATENT DOCUMENTS

KR 10-2009-0014316 A 2/2009
KR 10-1009421 B1 1/2011

OTHER PUBLICATIONS

Kim, J H et al., "Design of Super-regenerative Oscillator for Ultra Low Power Receiver Implementation", The Institute of Electronics and Information Engineers, 2006, Summer Convention vol. 29, 1, p. 595-596 (2 pages in Korean with English abstract).

* cited by examiner

*Primary Examiner* — Dhaval Patel
(74) *Attorney, Agent, or Firm* — NSIP Law

(57) ABSTRACT

A method and apparatus are provided to generate a preamble signal. A peak of each pulse of the preamble signal is synchronized with a sensitivity region of a super regenerative receiver (SRR). The method and apparatus are configured to transmit, to the SRR, a data packet comprising the preamble signal, wherein the data packet is a baseband signal corresponding to the preamble signal.

20 Claims, 10 Drawing Sheets

TIMING SYNCHRONIZATION SYSTEM AND METHOD OF SUPER REGENERATIVE RECEIVER BASED ON ULTRA LOW POWER COMMUNICATION

RELATED APPLICATIONS

This application claims the benefit of Indian Patent Application No. 3564/CHE/2013, filed on Aug. 9, 2013, and Korean Patent Application No. 10-2014-0057951, filed on May 14, 2014, in the Korean Intellectual Property Office, the disclosures of which are incorporated herein by reference in their entirety.

BACKGROUND

1. Field

The following description relates to a field of communication systems, and more particularly, to timing synchronization in a wireless communication system.

2. Description of Related Art

Receivers, such as a super regenerative receiver (SRR), are ultra low power radio receivers for low data rate applications. A basic structure of the SRR includes an antenna, a low noise amplifier (LNA), a super regenerative oscillator (SRO), an envelope detector (ED), an automatic gain control (AGC), a quench waveform generator, and a baseband filter (BBF). The operation principle of the SRR is based on a repeated build-up and decay of self-generated oscillations in the SRO having a frequency near radio frequency (RF) signal frequency intercepted by the antenna. The SRR is typically used in low power body area networks, remote control systems, such as garage door openers, robots, model ships, airplanes, short distance telemetry, and wireless security.

In general, frequency selectivity of the SRR is directly affected by an over quenching rate (OQR) of a quench signal. Currently, each data symbol is oversampled by a quench signal operating at a quench rate considerably higher than a data rate. This translates into relatively low frequency selectivity and an equivalent noise bandwidth that is much larger than the signal bandwidth. Thus, the SRR may be easily affected by out-of-band interference. Hence, it is desirable to maintain the OQR as low as possible. However, a higher OQR is needed to ensure that outputs are obtained for each incoming pulse envelope in the SRR. From these outputs, a fractional sample rate is chosen to maximize overall energy capture of an incoming signal. In order to improve an interference rejection, a lower OQR is required, but a higher OQR is necessary to improve the synchronization performance of the SRR.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an example, there is provided a method, including generating a preamble signal, wherein a peak of each pulse of the preamble signal is synchronized with a sensitivity region of a super regenerative receiver (SRR); and transmitting, to the SRR, a data packet including the preamble signal, wherein the data packet is a baseband signal corresponding to the preamble signal.

The generating of the preamble signal may include generating a basic binary sequence, repeating the generated basic binary sequence for a number of times, converting the repetitive basic binary sequences into repetitive basic pulse sequences, adding a first intermittent fractional shift between basic pulse sequences to obtain a block of synchronization sequence, repeating the block of synchronization sequences for a number of times, and adding a second intermittent fractional shift between blocks of synchronization sequences.

In accordance with another illustrative example, there is provided a method of a super regenerative receiver (SRR), the method includes detecting a data packet based on a baseband signal corresponding to a preamble signal received from a transmitter; setting a starting point of a first symbol of the preamble signal corresponding to the detected data packet; and synchronizing a peak of each pulse of the preamble signal with a sensitivity region of the SRR based on the starting point of the first symbol of the preamble signal corresponding to the data packet.

The detecting of the incoming data packet may include computing a correlation value by correlating the baseband signal with a basic sequence, comparing the computed correlation value and a threshold value and outputting a comparison result, and detecting the incoming data packet based on the comparison result.

The computing of the correlation value may include computing a correlation value for each period in a basic sequence of the preamble signal, and computing an average correlation value by averaging the computed correlation values corresponding to the periods in the basic sequence.

The setting of the starting point may include detecting a start frame delimiter (SFD) sequence of the baseband signal by computing a correlation value between the baseband signal and a SFD sequence, and determining a symbol synchronization point by comparing the computed correlation value and a threshold value.

The setting of the starting point further may include determining, according to a comparison between the computed correlation value and the threshold value, an index value corresponding to a correlation value obtained by correlating the baseband signal with a basic sequence, computing a set of correlation values using the index value, identifying, from the computed set of correlation values, a correlation value that is greater than or equal to a threshold value, and estimating a start index of the preamble signal based on a number of identified correlation values, wherein the starting point of the first symbol of the preamble signal is set based on the estimated start index.

The synchronizing of the peak of each pulse of the preamble signal may include determining a status of a pulse synchronization flag, and processing, based on the status of the pulse synchronization flag, the data packet remaining after shifting a quench waveform by a period.

The synchronizing of the peak of each pulse of the preamble signal may also include obtaining an average sample for each of basic sequences of the preamble signal based on the status of the pulse synchronization flag, computing a pulse offset error metric using the obtained average samples, and estimating, based on the computed pulse offset error metric, a shift required in the quench waveform with respect to a start index of the preamble signal in order to synchronize the peak of each pulse of the preamble signal with the sensitivity region of the SRR, wherein the peak of each pulse of the preamble signal is synchronized with the sensitivity region of the SRR based on the estimated shift.

The synchronizing of the peak of each pulse of the preamble signal may include identifying an index corresponding to a maximum correlation value from among the identified correlation values, and estimating, based on the identified index, a shift required in a quench waveform with respect to a start index of the preamble signal in order to synchronize the peak of each pulse of the preamble signal with the sensitivity region of the SRR, wherein the peak of each pulse of the preamble signal is synchronized with the sensitivity region of the SRR based on the estimated shift.

In accordance with an example, there is provided an apparatus, including a preamble signal generation module configured to generate a preamble signal, wherein a peak of each pulse of the preamble signal is synchronized with a sensitivity region of a super regenerative receiver (SRR); and a transmitter configured to transmit, to the SRR, a data packet that includes the preamble signal and is in a form of a baseband signal corresponding to the generated preamble signal.

The preamble signal may include a block of synchronization sequence, wherein the block of synchronization sequence includes basic sequences with an intermittent fractional shift of a time duration between consecutive basic sequences, and wherein each of the basic sequences has a length and includes a period.

The preamble signal generation module may be configured to: generate a basic binary sequence, repeat the basic binary sequence for a number of times, convert the repetitive basic binary sequences into repetitive basic pulse sequences, add a first intermittent fractional shift between basic pulse sequences to obtain a block of synchronization sequences, repeat the block of synchronization sequences for a number of times, and add a second intermittent fractional shift between blocks of synchronization sequences.

In accordance with an example, there is provided super regenerative receiver (SRR), including a packet detection module configured to detect a data packet based on a baseband signal corresponding to a preamble signal received; a symbol synchronization module configured to set a starting point of a first symbol of the preamble signal corresponding to the detected data packet; and a pulse synchronization module configured to synchronize a peak of each pulse of the preamble signal with a sensitivity region of the SRR based on the starting point of the first symbol of the preamble signal corresponding to the data packet.

The packet detection module may be configured to: compute a correlation value by correlating the baseband signal with a basic sequence, compare the computed correlation value and a threshold value, and detect the data packet based on a comparison result.

The packet detection module may be configured to: compute a correlation value for each period in a basic sequence of the preamble signal, and compute an average correlation value by averaging the computed correlation values corresponding to the periods in the basic sequence.

The symbol synchronization module may be configured to: detect a start frame delimiter (SFD) sequence of the baseband signal by computing a correlation value between the baseband signal and a SFD sequence, and determine a symbol synchronization point by comparing the correlation value and a threshold value.

The symbol synchronization module may be configured to: determine, according to a comparison between the computed correlation value and the predetermined threshold value, an index value corresponding to a correlation value obtained by correlating the baseband signal with a basic sequence, compute a set of correlation values by using the index value, identify, from the set of correlation values, a correlation value that is greater than or equal to a threshold value, estimate a start index of the preamble signal based on a number of identified correlation values, and set the starting point of the first symbol of the preamble signal based on the estimated start index.

The pulse synchronization module may be configured to: determine a status of a pulse synchronization flag, and process, based on the status of the pulse synchronization flag, the data packet remaining after shifting a quench waveform by a period.

The pulse synchronization module may be configured to: obtain an average sample for each of basic sequences of the preamble signal based on the status of the pulse synchronization flag, compute a pulse offset error metric by using the obtained average samples, estimate, based on the computed pulse offset error metric, a shift required in the quench waveform with respect to a start index of the preamble signal in order to synchronize the peak of each pulse of the preamble signal with the sensitivity region of the SRR, and synchronize the peak of each pulse of the preamble signal with the sensitivity region of the SRR based on the estimated shift.

The pulse synchronization module may be configured to: identify an index corresponding to a maximum correlation value from among the identified correlation values, estimate, based on the identified index, a shift required in a quench waveform with respect to a start index of the preamble signal in order to synchronize the peak of each pulse of the preamble signal with the sensitivity region of the SRR, and synchronize the peak of each pulse of the preamble signal with the sensitivity region of the SRR based on the estimated shift.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
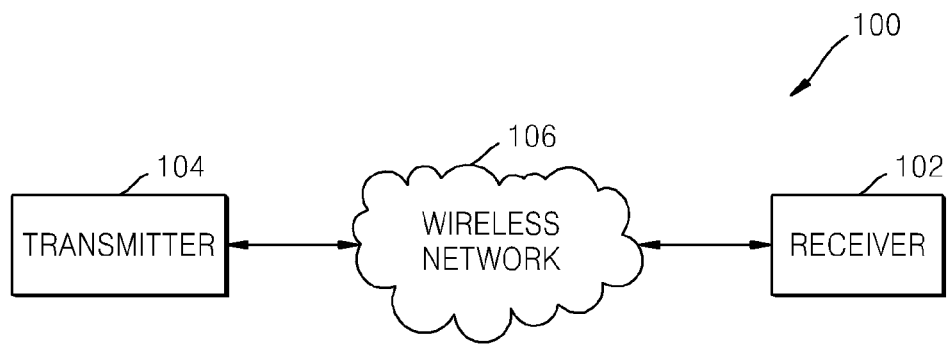
FIG. 1 is a block diagram of a wireless communication system, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. As used herein, expressions such as "at least one of," when preceding a list of elements, modify the entire list of elements and do not modify the individual elements of the list.

Reference will now be made in detail to embodiments, examples of which are illustrated in the accompanying drawings. In this regard, the embodiments may have different forms and should not be construed as being limited to the descriptions set forth herein. Elements and features that may be easily derived by one of ordinary skill in the art to which the present disclosure pertains based on the detailed description of the embodiments are within the spirit and scope of the present disclosure as defined by the appended claims In addition, it will be understood that although the terms "first", "second", etc. may be used herein to describe various components, these components should not be limited by these terms and should not refer to a particular order or arrangement of the components. These components are only used to distinguish one component from another.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a wireless communication system 100, according to an embodiment. In FIG. 1, the wireless communication system 100 includes a receiver 102, a transmitter 104, and a wireless network 106. The transmitter 104 and the receiver 102 are wirelessly connected through the wireless network 106. In one illustrative example, the receiver 102 is a super regenerative receiver (SRR).

In the wireless communication system 100, the transmitter 104 generates and transmits data packets each including a preamble signal, a start frame delimiter (SFD), and data payload. The preamble signal includes blocks of synchronization sequences (also referred to as training sequences) with a first intermittent fractional shift between the consecutive blocks of synchronization sequences. Each block of synchronization sequence includes repetitive basic sequences with a second intermittent fractional shift. Further, each basic sequence includes one or more periods with good correlation properties.

The receiver 102 continuously determines a presence of data packets in the air. When the transmitter 104 transmits the preamble signal in the form of a baseband signal, the receiver 102 detects the presence of data packets in the air based on the incoming baseband signal. Once a data packet is detected, the receiver 102 determines a starting point of the preamble signal, and synchronizes a peak of each pulse of the preamble signal with a sensitivity region of the receiver 102 by shifting a quench waveform having an over quenching rate (OQR) equal to 1 with respect to the starting point of the preamble signal. A sensitivity region of the receiver 102 corresponds to a region where the regenerative gain of the SRR has a significant value. For example, the sensitivity region of the SRR is a negative slop zero crossing of the quench waveform or any other arbitrary point where the regenerative gain of the SRR is significant. Accordingly, the quench waveform is shifted such that a combination of the incoming baseband signal and the sensitivity region maximizes the regenerative gain of the SRR. Thereafter, the receiver 102 processes the remaining incoming baseband signal and proceeds with data detection.

Figure 2:
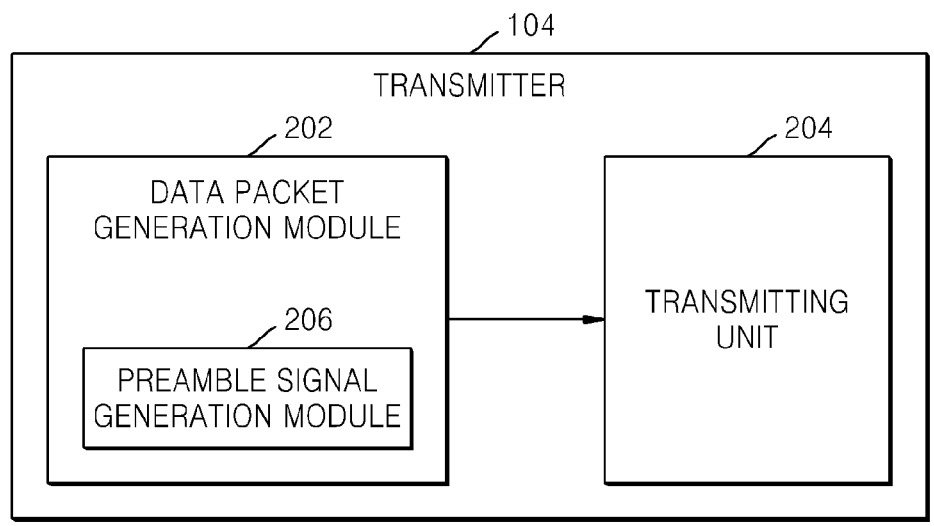
FIG. 2 is a block diagram of a transmitter of FIG. 1, according to an embodiment.
Figure 4:
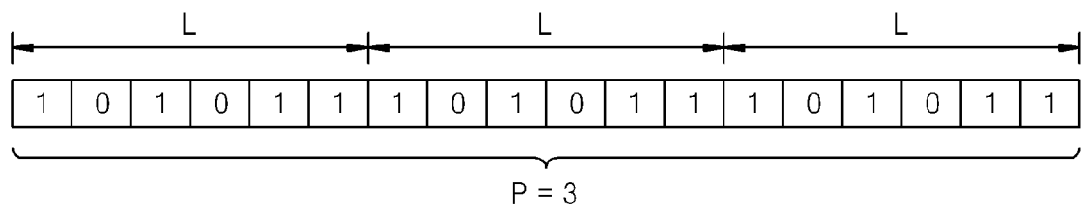
FIG. 4 is a diagram of an exemplary basic binary sequence used for generating the preamble signal.

FIG. 2 is a block diagram of the transmitter 104 of FIG. 1, according to an embodiment. The transmitter 104 includes a data packet generation module 202 and a transmitting unit 204. The data packet generation module 202 includes a preamble signal generation module 206. The data packet generation module 202 is configured to generate data packets carrying data intended for the receiver 102. Each data packet includes a preamble signal, an SFD, and payload data. The preamble signal generation module 206 is configured to generate a preamble signal. The preamble signal enables the receiver 102 to perform timing synchronization with the transmitter 104. In order to generate the preamble signal, the preamble signal generation module 206 selects a basic binary sequence with good correlation properties. The basic binary sequence may be inherently periodic with P periods and length L. For example, the basic binary sequence is a pseudo noise sequence (PN sequence) (formed using 0s and 1s) with P periods and length L, as shown in FIG. 4. The preamble signal generation module 206 repeats the basic binary sequence for a predetermined number of times (e.g., Q=3). The preamble signal generation module 206 converts the basic binary sequences into basic pulse sequence using a pulse shaping filter. In one exemplary implementation, the basic binary sequences are upsampled by a specific factor. Then, using a Gaussian filter or a raised cosine filter, is in the upsampled basic binary sequences are translated into discrete waveforms of a predetermined pulse shape with an associated time period $T_s$. Consequently, basic pulse sequences including pulses and zeros of length $LPT_s$ with Q repetition are obtained.

Thereafter, the preamble signal generation module 206 introduces intermittent fractional shift of duration $\alpha T_s$ between the basic pulse sequences, where $T_s$ is a time period of a single pulse and a value of a lies between 0 and 1. The value of '$\alpha$' is selected such that different portions of pulses in the basic pulse sequences fall within the sensitivity region of the receiver 102 during each of the basic pulse sequences. In one example, the value of $\alpha$ is equal to $T_s/4$. It can be noted that, the intermittent fractional shift $\alpha T_s$ is a fractional multiple of the time period of the single pulse. In other words, intermittent fractional shift is obtained by multiplying a value between 0 and 1 to the time period of the single pulse. For example, for repetition of binary pulse sequences (Q)=3, the preamble signal generation module 206 introduces the intermittent fractional shift between a first basic pulse sequence and a second basic pulse sequence, and another intermittent fractional shift between the second basic pulse sequence and a third basic pulse sequence. Hence, when Q=3, the preamble signal generation module 206 introduces Q−1 intermittent fractional shifts. The intermittent fractional shift is introduced such that the sensitivity region of the receiver 102 occurs at different positions of pulses in different portions of the preamble signal. Also, the intermittent fractional shift is introduced such that energy capture of the receiver 102 changes for each period of the preamble signal. In this manner, the preamble signal generation module 206 generates a single block of synchronization sequence including repetitive basic pulse sequences of length $LPT_S$ with the intermittent fractional shift $\alpha T_s$ between two basic pulse sequences.

In some embodiments, the preamble signal generation module 206 generates blocks of synchronization sequences with intermittent fractional shifts $\beta T_s$ between the blocks of synchronization sequences such that a total sum of the fractional shifts is $(Q-1)\alpha T_s + \beta T_s(i)$, where i=1−(Z−1) is an integral multiple of the time period of a single pulse $T_s$. The preamble signal generation module 206 generating of the blocks of synchronization sequences ensures that each of the blocks of synchronization sequences behave in the same manner or consistently at the receiver 102 as each of corresponding portions of the blocks of synchronization sequences influences the sensitivity region of the receiver 102. The value of $\beta$ is selected such that each block of synchronization sequence has consistent characteristics as other blocks in the synchronization sequence or that each block of synchronization sequence behaves in a similar manner when passed through the receiver 102. In one illustrative example, $\beta = T_s/2$ when Q=3 and $\alpha = T_s/4$. In another illustrative example, the value of $\beta$ may range from 0 to 1.

As described above, the blocks of synchronization sequences are followed by an SFD sequence s(t). The SFD sequence is added to obtain a good estimate of a starting point of a first symbol of the preamble signal. For example, the SFD sequence is a binary sequence (e.g., 01011001) having a length of 8 or 16 with good correlation properties which is upsampled and passed through a pulse shaping filter.

Once the data packet is generated, the transmitting unit 204 transmits the data packet with the preamble signal to the receiver 102.

Figure 3:
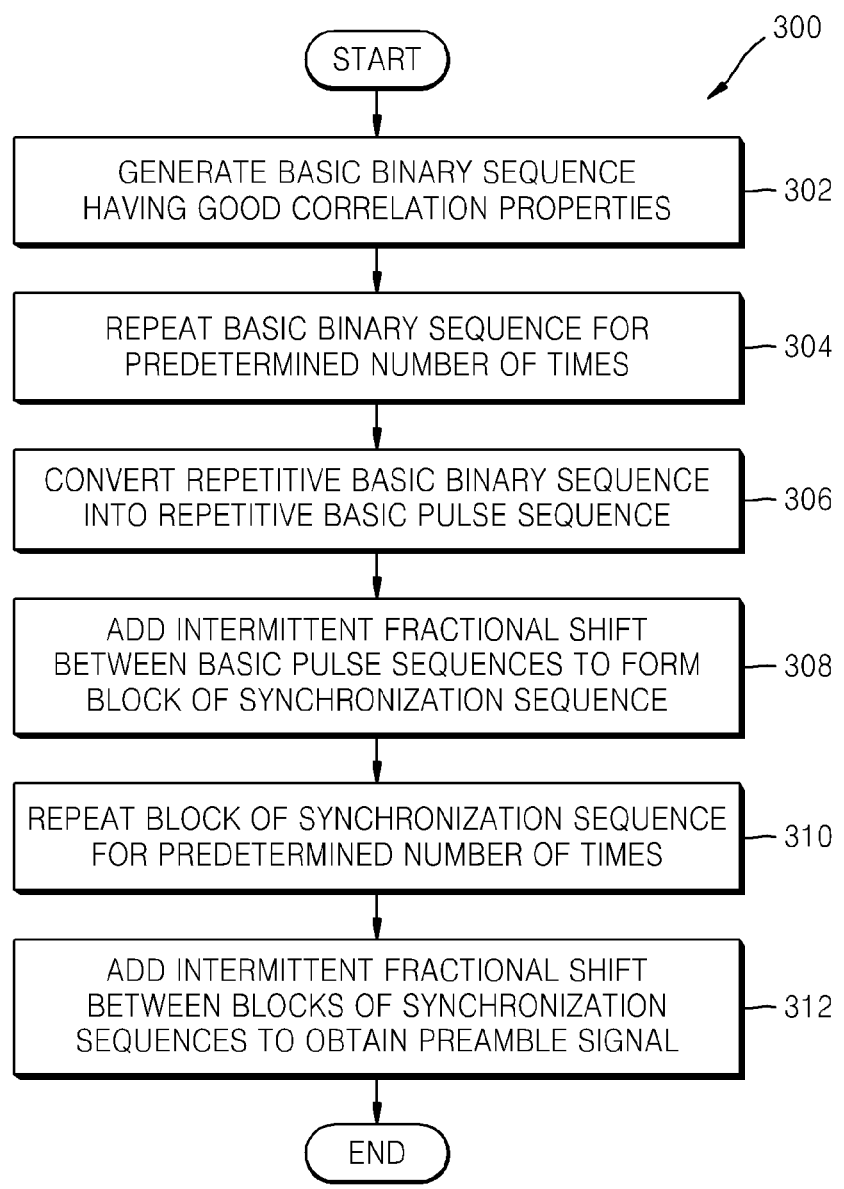
FIG. 3 is a flowchart of an exemplary method of generating a preamble signal, according to an embodiment.

FIG. 3 is a flowchart 300 of an exemplary method of generating a preamble signal, according to an embodiment. In operation 302, the method generates a basic binary sequence with P periods and length L having good correlation properties. For example, the basic binary sequence is a PN sequence. In operation 304, the method repeats the basic binary sequence for a predetermined number of times (Q). In operation 306, the method converts the repetitive basic binary sequence into a repetitive basic pulse sequence with 0s and pulses using a pulse shaping filter.

In operation 308, the method adds an intermittent fractional shift $\alpha T_s$ between basic pulse sequences to form a block of synchronization sequence. In operation 310, the method repeats the block of synchronization sequence for a predetermined number of times. In operation 312, the method adds an intermittent fractional shift $\beta T_s$ between blocks of synchronization sequences to obtain a preamble signal. Operation 310 and 312 are optional. In other words, the preamble signal may include a single bock of synchronization sequence instead of blocks of synchronization sequences.

Figure 5:
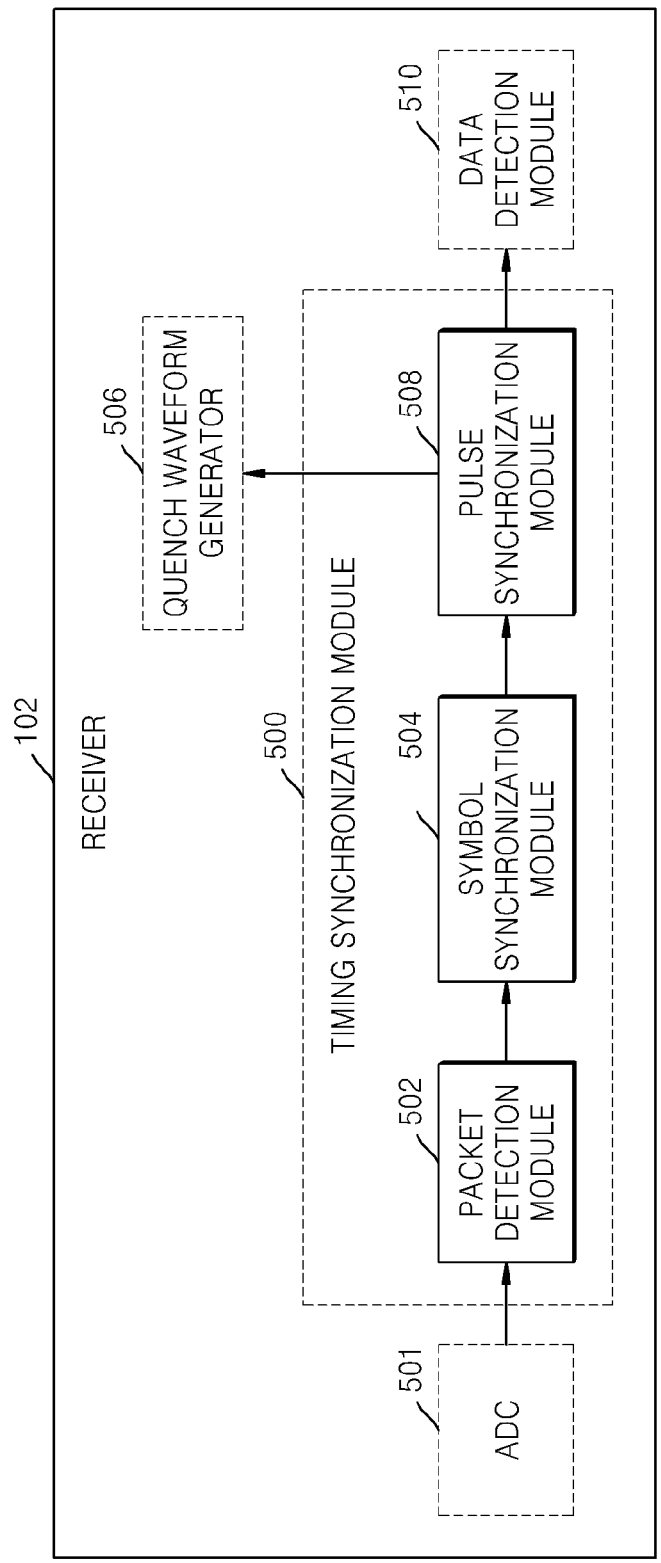
FIG. 5 is a block diagram of a receiver of FIG. 1, according to an embodiment.

FIG. 5 is a block diagram of a receiver of FIG. 1, according to an embodiment. The receiver 102 includes an analog-to-digital converter (ADC) 501, a timing synchronization module 500, a quench waveform generator 506, and a data detection module 510. The timing synchronization module 500 includes a packet detection module 502, a symbol synchronization module 504, and a pulse synchronization module 508.

The ADC 501 converts an incoming baseband signal from an analog form to a digital form. The packet detection module 502 continuously monitors a presence of data packets in the air based on an input signal received from the ADC 501. When the transmitter 104 transmits a data packet in a form of the baseband signal, the receiver 102 determines a presence of the data packet based on the incoming baseband signal. Upon detecting the data packet, the symbol synchronization module 504 estimates a start index of the preamble signal corresponding to the detected data packet, and sets a starting point of a first symbol of the preamble signal based on the estimated start index. The pulse synchronization module 508 calculates a shift $\lambda$ required in a quench waveform in order to synchronize a peak of each pulse of the preamble signal corresponding to the detected data packet with a sensitivity region of an SRR. In some embodiments, the generated quench waveform has an OQR equal to 1. Also, the pulse synchronization module 508 provides information required for synchronizing a peak of each pulse of the remaining incoming baseband signal with the quench waveform. The data detection module 510 processes the remaining baseband signal after the above-described synchronization and detects payload data in the data packet.

Figure 6:
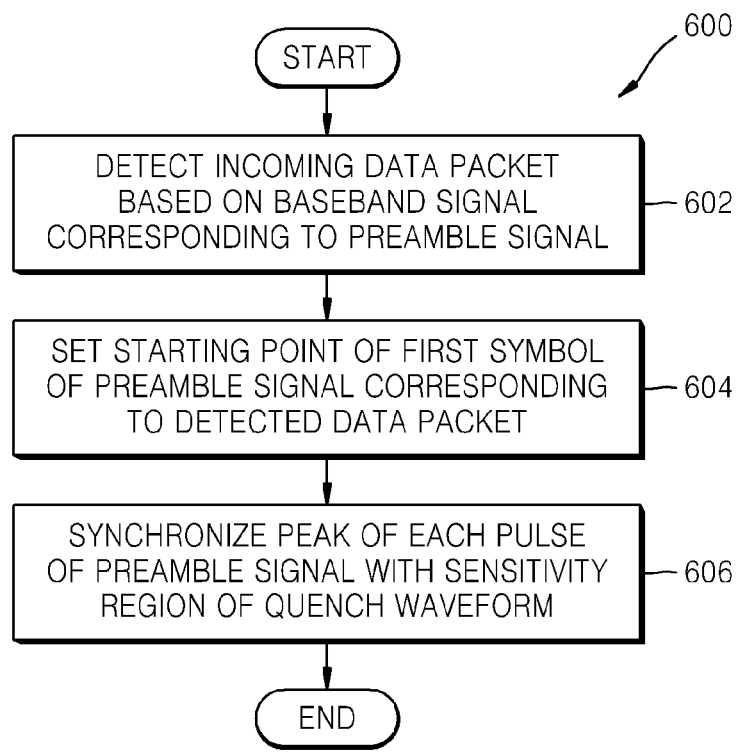
FIG. 6 is a flowchart of an exemplary method of timing synchronization in a receiver, according to an embodiment.

FIG. 6 is a flowchart 600 of a method to time synchronization in the receiver 102, according to an embodiment. When the transmitter 104 transmits a baseband signal corresponding to a preamble signal to the receiver 102, the receiver 102 synchronizes its timing with the transmitter 104 as described in operations 602 to 606.

In operation 602, the method detects an incoming data packet based on the baseband signal received from the transmitter 104. The baseband signal corresponds to a data packet carrying the preamble signal transmitted by the transmitter 104. The preamble signal includes at least one block of synchronization sequence, and each block of synchronization sequence includes a basic pulse sequence with an intermittent fractional shift $\alpha T_s$ of predetermined time duration between consecutive basic sequences. The basic sequences with the intermittent fractional shift of predetermined time duration enable the receiver 102 to detect an incoming data packet. The detailed process of detecting an incoming data packet is illustrated in FIG. 7.

Figure 8:
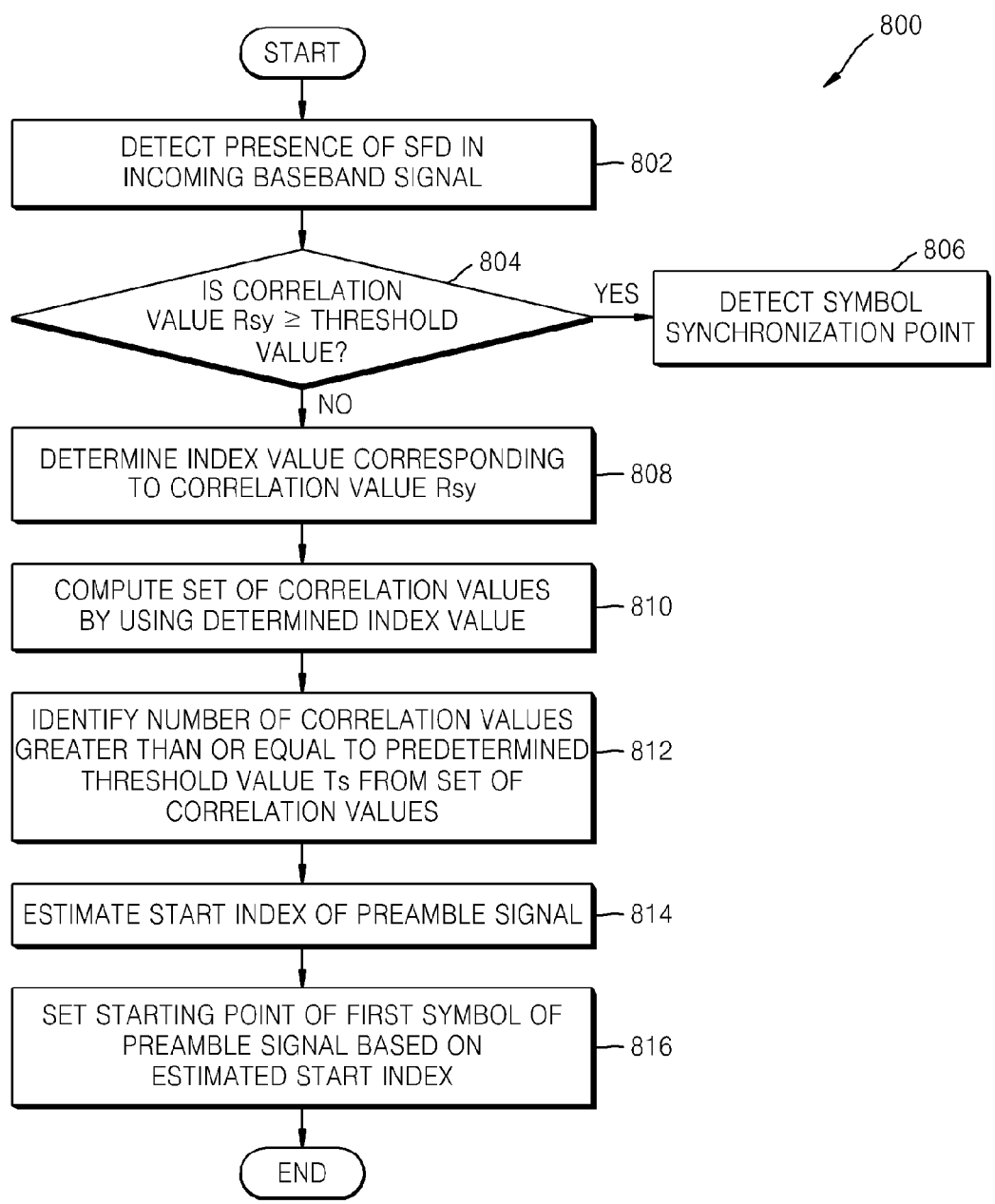
FIG. 8 is a flowchart of an exemplary method of setting a starting point of a preamble signal corresponding to a detected data packet, according to an embodiment.

In operation 604, the method estimates a start index of the preamble signal corresponding to the detected data packet, and a starting point of a first symbol of the preamble signal is set based on the estimated start index. When the data packet is detected, an index at which the data packet is detected is determined. Also, the method determines peaks existing around the index of the detected data packet. Based on the number of peaks, the method determines an index corresponding to the farthest peak around the index of the detected data packet as a start index of the preamble signal. Based on the start index, the method sets the starting point of the first symbol of the preamble signal. A detailed process of determining the start index of the preamble signal is illustrated in FIG. 8.

Figure 9:
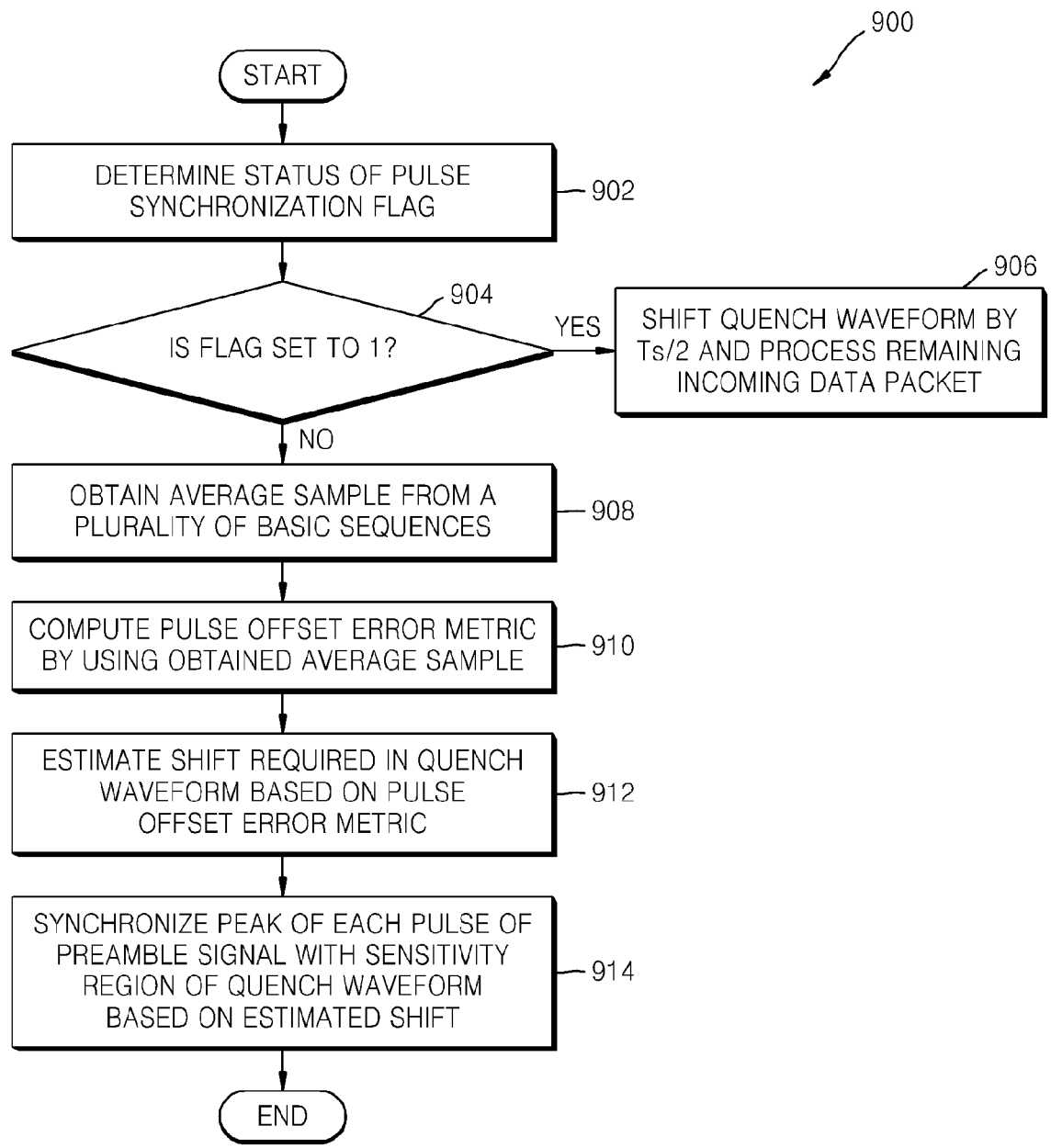
FIG. 9 is a flowchart of an exemplary method of synchronizing a peak of each pulse of a preamble signal corresponding to a detected data packet within a sensitivity region of a receiver, according to an embodiment.

In operation 606, based on the starting point of the first symbol of the preamble signal, the method synchronizes a peak of each pulse of the preamble signal corresponding to the detected data packet with the sensitivity region of the receiver 102. In some embodiments, the peak of each pulse is synchronized with the sensitivity region of the receiver 102 by shifting the quench waveform from the starting point of the first symbol of the preamble signal such that the peak of each pulse falls within the sensitivity region of the receiver 102. A detailed process of the above-described synchronization is illustrated in FIG. 9.

Figure 7:
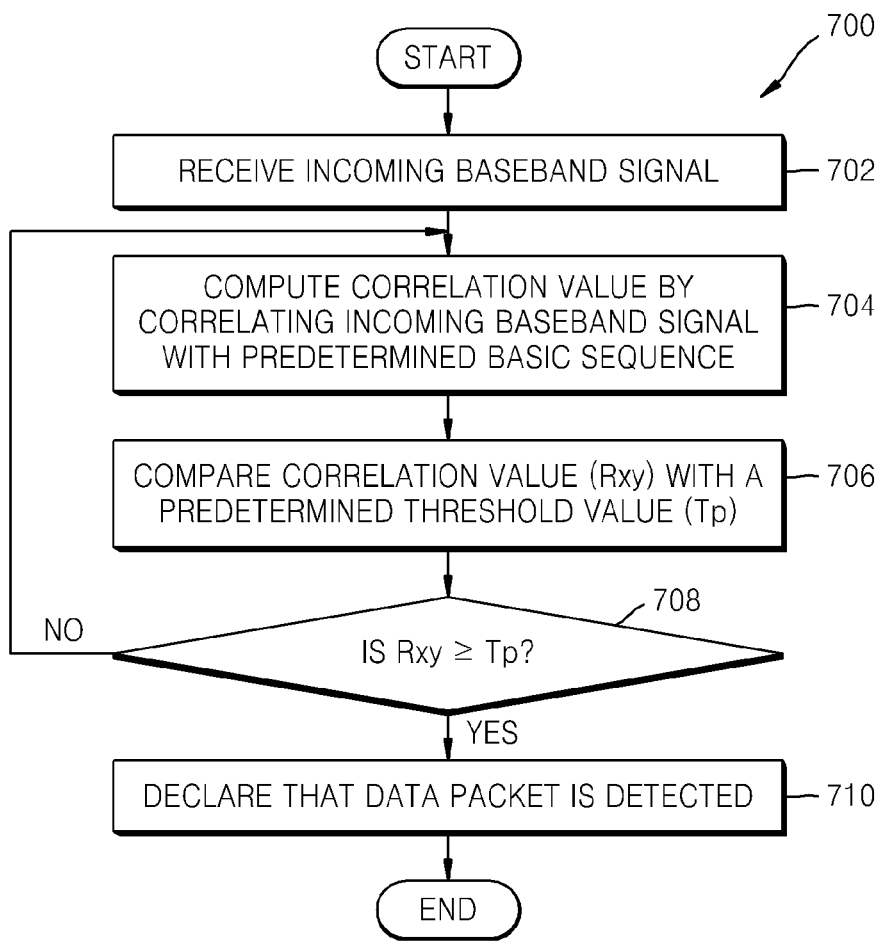
FIG. 7 is a flowchart of an exemplary method of detecting an incoming data packet based on a baseband signal, according to an embodiment.

FIG. 7 is a flowchart 700 of a method to detect an incoming data packet based on a baseband signal, according to an embodiment. In operation 702, the method receives an incoming baseband signal. The baseband signal may correspond to a preamble signal transmitted from the transmitter 104. The preamble signal includes at least one training sequence, and each training sequence includes at least one basic sequence. Each basic sequence includes at least one period P. In operation 704, the method computes a normalized sliding correlation value by correlating the incoming baseband signal y(t) with a predetermined basic sequence x(t). In some embodiments, a single period of the basic sequence x(t) is correlated with the incoming baseband signal y(t) to obtain a correlation value. In these embodiments, a correlation value for a single period of the basic sequence is computed by Equation 1:

$$R_{xy}(\tau) = \frac{\frac{1}{L}\sum_{i=0}^{L-1} x(i)y(\tau+i)}{\sqrt{\frac{1}{L}\sum_{i=0}^{L-1}[x(i)-\bar{x}]^2}\sqrt{\frac{1}{L}\sum_{i=0}^{L-1}[y(\tau+i)-\bar{y}(\tau)]^2}}$$  [Equation 1]

where L is a length of the basic sequence, P is a period, and $\bar{x}$ and $\bar{y}$ satisfy:

$$\bar{x} = \frac{1}{L}\sum_{i=0}^{L-1} x(i)$$  [Equation 1-1]

and $$\bar{y}(\tau) = \frac{1}{L}\sum_{i=0}^{L-1} y(\tau+i).$$  [Equation 1-2]

According to an embodiment, in order to reduce a probability of false alarm, the method detects the incoming data packet based on the baseband signal when the incoming signal satisfies Equation 1-3.

$$x(t)=x'(t), x'(t) \in [0,1]$$  [Equation 1-3]

If the preamble signal includes a basic sequence with a single period (i.e., P=1), the method obtains a single correlation value. However, when the preamble signal includes a basic sequence with more than one period, then the method computes a correlation value of each period in the basic sequence by using Equation 1. Also, the correlation values are averaged to obtain an average correlation value by Equation 2.

$$\bar{R}_{xy}(\tau) = \frac{1}{P}\sum_{i=0}^{P-1} R_{xy}(\tau+iL)$$  [Equation 2]

Furthermore, if the preamble signal includes a plurality of blocks of synchronization sequences, the method averages respective average correlation values of the plurality of blocks of synchronization sequences using Equations 3 and 3-1:

$$\bar{R}_{B,xy}(\tau) = \frac{1}{Z}\sum_{i=0}^{Z-1} \bar{R}_{xy}(\tau+i\chi)$$  [Equation 3]

$$\chi = Q(LP+1)$$  [Equation 3-1]

where Z is the number of basic sequences in the preamble signal.

In operation 706, the method compares the correlation value $R_{xy}$ with a predetermined threshold value $T_p$. The method computes the predetermined threshold value $T_p$ based on a requisite probability of missed detection and a probability of false alarm. The method determines the predetermined threshold value $T_p$ such that the predetermined threshold value $T_p$ satisfies the probability of missed detection under a constraint on the probability of false alarm. For example, the method sets the predetermined threshold value $T_p$ around 0.6 to 0.8.

In operation 708, the method determines whether the correlation value $R_{xy}$ is greater than or equal to the predetermined threshold value $T_p$. If the correlation value $R_{xy}$ is greater than or equal to the predetermined threshold value $T_p$, at operation 710, the method declares a data packet as detected.

FIG. 8 is a flowchart 800 of an exemplary method of setting a starting point of a preamble signal corresponding to a detected data packet, according to an embodiment. In operation 802, the method detects a presence of an SFD sequence in an incoming baseband signal y(t) by correlating the incoming baseband signal y(t) and a predetermined SFD sequence s(t). In some embodiments, the incoming baseband signal y(t) is correlated with the predetermined SFD sequence s(t) by Equation 4.

$$R_{sy}(\tau) = \frac{\frac{1}{L_S}\sum_{i=0}^{L_S-1} s(i)y(i+\tau)}{\sqrt{\frac{1}{L_S}\sum_{i=0}^{L_S-1}[s(i)-\bar{s}]^2}\sqrt{\frac{1}{L_S}\sum_{i=0}^{L_S-1}[y(\tau+i)-\bar{y}(\tau)]^2}}$$  [Equation 4]

where $L_s$ is a length of a predetermined SFD sequence s(i).

In operation 804, the method determines whether a correlation value $R_{sy}$ obtained from Equation 4 is greater than or equal to a predetermined threshold value $T_f$. The threshold value $T_f$ is set such that the threshold value $T_f$ satisfies the probability of missed detection under a constraint on the probability of false alarm. For example, the threshold value $T_f$ is set around 0.7 to 0.8. If the correlation value $R_{sy}$ is greater than or equal to the threshold value $T_f$, then the method would determine that the SFD sequence s(t) is present in the incoming baseband signal y(t). If the correlation value $R_{sy}$ is smaller than the predetermined threshold value $T_f$, the method would determine that the SFD sequence s(t) is not present in the incoming baseband signal y(t).

If the SFD sequence s(t) is detected, at operation 806, the method determines a symbol synchronization point is determined in operation 806. In some embodiments, the symbol synchronization point may correspond to a point where the SFD sequence s(t) is detected in the incoming baseband signal y(t). If the SFD sequence s(t) is not detected, at operation 808, the method determines an index value $\tau_p$, corresponding to the correlation value $R_{xy}$. The correlation value $R_{xy}$ is a value at which the incoming data packet is detected.

In operation 810, the method computes a set of correlation values $\bar{R}_{xy}$ using the determined index value $\tau_p$. The correlation values $\bar{R}_{xy}$ are computed by Equation 5:

$$\bar{R}_{xy}(\tau) = \frac{1}{P}\sum_{i=0}^{P-1} R_{xy}(\tau + iL)$$ [Equation 5]

For example, if a number of basic sequences (Q) is 3, the set of correlation values may be represent as the following set:

$$\{\bar{R}_{xy}(\tau_p-2(LP+1)), \bar{R}_{xy}(\tau_p-(LP+1)), \bar{R}_{xy}(\tau_p),$$
$$\bar{R}_{xy}(\tau_p+(LP+1)), \bar{R}_{xy}(\tau_p+2(LP+1))$$
$$\bar{R}_{xy}(\tau_p-2(LP+1)+1), \bar{R}_{xy}(\tau_p-(LP+1)+1), \bar{R}_{xy}(\tau_p),$$
$$\bar{R}_{xy}(\tau_p+(LP+1)-1), \bar{R}_{xy}(\tau_p+2(LP+1)-1)\}$$ [Equation 5-1]

The set of correlation values may be generalized by Equation 5-2.

$$\bar{R}_{xy} = \{\bar{R}_{xy}(\tau_p+i(LP+1)-sgn(i) \times j)\}, i \in [-(Q-1),(Q-1)], j \in [0,1]$$ [Equation 5-2]

In operation 812, the method identifies at least one correlation value that is greater than or equal to a predetermined threshold value $T_s$ from the set of correlation values. The threshold value $T_s$ is selected such that the threshold value $T_s$ satisfies the probability of missed detection under a constraint on the probability of false alarm. For example, the threshold value $T_s$ is set around 0.4 to 0.8. In operation 814, the method estimates a start index $\tau_s$ of the preamble signal based on the number of correlation values identified in operation 812. The start index $\tau_s$ indicates a starting point of a first symbol of a preamble signal transmitted by the transmitter 104. In operation 816, the method sets the starting point of the first symbol of the preamble signal based on the start index $\tau_s$ of the preamble signal.

For example, in response to the number of correlation values being greater than or equal to the number of basic sequences (Q) in the preamble signal, the method sets the minimum value of the start index $\tau_s$ corresponding to the identified correlation values as the starting point of the first symbol of the preamble signal.

Alternatively, the method computes a difference of index values between a first correlation value and a second correlation value, and a difference of index values between a second correlation value and a third correlation value. If the differences of the index values are respectively equal to Q and Q+1, then the method computes a correlation value by correlating the incoming baseband signal y(t) with the predetermined SFD sequence s(t) shifted from the maximum index $\tau_{Pmax}$ of the at least one correlation value identified in operation 812 to around Q. For example, a correlation value is computed by Equation 6.

$$R_{sy}(\tau_{pmax}+LP) = \frac{\sum_{i=0}^{L_S-1} s(i)y(i+\tau_{pmax}+LP)}{\sqrt{\frac{1}{L_S}\sum_{i=0}^{L_S-1}[s(i)-\bar{s}]^2} \sqrt{\frac{1}{L_S}\sum_{i=0}^{L_S-1}[y(\tau_{pmax}+LP+i)-\bar{y}(\tau)]^2}}$$ [Equation 6]

Furthermore, a maximum correlation value $R_{sy}$ is selected from correlation values obtained by Equation 6 and compared with the predetermined threshold value $T_f$. If the maximum correlation value $R_{sy}$ exceeds the predetermined threshold value $T_f$, then the method offsets the starting point of the first symbol by an offset duration from the index corresponding to the maximum correlation value $R_{sy}$. The method computes the offset duration using Equation 7.

$$\tau_s = \tau_{SFD} - QLP - 1$$ [Equation 7]

where $\tau_{SFD}$ is an index value corresponding to a correlation value using which the SFD sequence s(t) is detected in the incoming baseband signal y(t).

The above-described process of estimating the starting point of the first symbol is generally applicable in cases where a low amplitude portion of a first period of the basic sequence of the preamble signal falls within the sensitivity region of the receiver 102.

If the duration between successive correlation values is greater than Q+1, the method determines an index $\tau_s$ corresponding to the minimum value of successive correlation values as the starting point of the first symbol of the preamble signal. However, if the number of correlation values is less than the number of basic sequences (Q) of the preamble signal, the method computes the correlation value by correlating the incoming baseband signal y(t) with the predetermined SFD sequence s(t) shifted from the maximum index $\tau_{Pmax}$ of the correlation values identified in operation 812 by (L*P). For example, a maximum correlation value $R_{sy}(\tau_{Pmax}+LP)$ is computed by Equation 8.

$$R_{sy}(\tau_{pmax}+LP) = \frac{\frac{1}{L_S}\sum_{i=0}^{L_S-1} s(i)y(i+\tau_{pmax}+LP)}{\sqrt{\frac{1}{L_S}\sum_{i=0}^{L_S-1}[s(i)-\bar{s}]^2} \sqrt{\frac{1}{L_S}\sum_{i=0}^{L_S-1}[y(\tau+i)-\bar{y}(\tau)]^2}}$$ [Equation 8]

Furthermore, the maximum correlation value $R_{sy}(\tau_{Pmax}+LP)$ is compared with the predetermined threshold value $T_f$. If the correlation value $R_{sy}(\tau_{Pmax}+LP)$ exceeds the predetermined threshold value $T_f$, then the starting point $\tau_s$ of the first symbol is computed by Equation 9.

$$\tau_s = \tau_{pmax} - 2(LP+1)$$ [Equation 9]

If the maximum correlation value $R_{sy}(\tau_{Pmax}+LP)$ is smaller than the predetermined threshold value $T_f$, the method selects the index $\tau_s$ of the minimum value of the correlation values as the starting point of the first symbol of the preamble signal. If the number of identified correlation value $R_{sy}(\tau_{Pmax}+LP)$ is equal to 1, the method considers the index $\tau_s$ corresponding to the identified correlation value $R_{sy}(\tau_{Pmax}+LP)$ as the starting point of the first symbol of the preamble signal.

Once the starting point of the preamble signal is set as the start index $\tau_s$, the incoming baseband signal with the set starting point of the preamble signal $y_s(t)$ is provided to the pulse synchronization module 508 so as to synchronize a peak of each pulse of the preamble signal with the sensitivity region of the receiver 102 as described below.

FIG. 9 is a flowchart 900 of a method to synchronize the peak of each pulse of the preamble signal corresponding to the detected data packet with the sensitivity region of the receiver 102, according to an embodiment. In operation 902, the method determines a status of a pulse synchronization flag. During estimation of the start index $\tau_s$ of the preamble signal, the pulse synchronization flag is set to 0 or 1. When the pulse synchronization flag is 0, the pulse synchronization flag indicates that synchronization of the peak of each pulse with the sensitivity region of the receiver 102 needs to be performed. On the other hand, when the pulse synchronization flag is 1, the synchronization of the peak of each pulse is not to be performed. For example, the method sets the pulse synchronization flag to 1 when low amplitude portions of the first period fall within the sensitivity region of the receiver 102. Also, the pulse synchronization flag is set to 1 when the number of correlation values is less than Q−1 and the maximum value of the correlation values is greater than the predetermined threshold value $T_f$.

In operation 904, the method determines whether the pulse synchronization flag is set to 1. If the pulse synchronization flag is set to 1. Then, in operation 906, the method shifts a quench waveform of the receiver 102 by duration equal to $T_s/2$ and processes the incoming data packet based on the shifted quench waveform.

If the pulse synchronization flag is set to 0, then in operation 908, the method obtains an average sample corresponding to each period of the basic sequence of the preamble signal. For example, if the basic sequence has 3 periods (i.e., P=3), then an average sample $S_\lambda$ that corresponds to the 3 periods is computed by Equations 10 to 12.

$$S_\lambda(1) = \frac{1}{LP}\sum_{i=0}^{LP-1} y_s(i) \qquad \text{[Equation 10]}$$

$$S_\lambda(2) = \sum_{i=LP+1}^{2LP} y_s(i) \qquad \text{[Equation 11]}$$

$$S_\lambda(3) = \frac{1}{L}\sum_{i=2(LP+1)}^{3LP+1} y_s(i) \qquad \text{[Equation 12]}$$

Alternatively, the method computes the average samples $S_\lambda(1)$, $S_\lambda(2)$, and $S_\lambda(3)$ with respect to is in the basic sequences of the preamble signal by Equations 10 to 12.

In operation 910, the method computes a pulse offset error metric $\beta_\lambda$ using the obtained average samples. For example, the method computes the pulse offset error metric using Equation 13.

$$\beta_\lambda = \frac{S_\lambda(1) - S_\lambda(3)}{S_\lambda(2)} \qquad \text{[Equation 13]}$$

In operation 912, the method estimates a shift λ required in the quench waveform with respect to the starting point of the first symbol of the preamble signal using the pulse offset error metric $\beta_\lambda$. In some embodiments, the method estimates the shift λ required in the quench waveform corresponding to the pulse offset error metric $\beta_\lambda$ using a lookup table. The lookup table includes N values of the pulse offset error metric $\beta_\lambda$ and the shift λ required in the quench waveform corresponding to the pulse offset error metric $\beta_\lambda$ varies from 0 to T.

In operation 914, the method synchronizes the peak of each pulse of the preamble signal with the sensitivity region of the receiver 102 by shifting the quench waveform from the starting point of the first symbol of the preamble signal by the determined shift λ. Consequently, the sensitivity region of the quench waveform is aligned with the peak of each pulse of the incoming baseband signal in order to maximize the regenerative gain. This is possible due to the addition of the intermittent fractional shifts $\alpha T_s$ and $\beta T_s$ in the preamble signal because different portions of the incoming baseband signal fall within the sensitivity region of the receiver 102 during different portions of the preamble signal. Once the peak of each pulse is synchronized, the method feeds again the quench waveform and the incoming baseband signal for further processing.

The value of λ computed in operation 912 may be applicable when the number of basic sequences (Q) in a block of synchronization sequence is less than or equal to 3. However, when Q>3, a fractional shift λ or $T_{foff}$ required in the quench waveform with respect to the starting point of the first symbol of the preamble signal is estimated by Equation 14.

$$\lambda = \left[\frac{N_{max}}{LP}\right]\alpha T_S \qquad \text{[Equation 14]}$$

where $N_{max}$ is an index corresponding to the maximum correlation value obtained from the set of correlation values greater than the predetermined threshold value $T_s$ identified in operation 812 of FIG. 8.

Figure 10A:
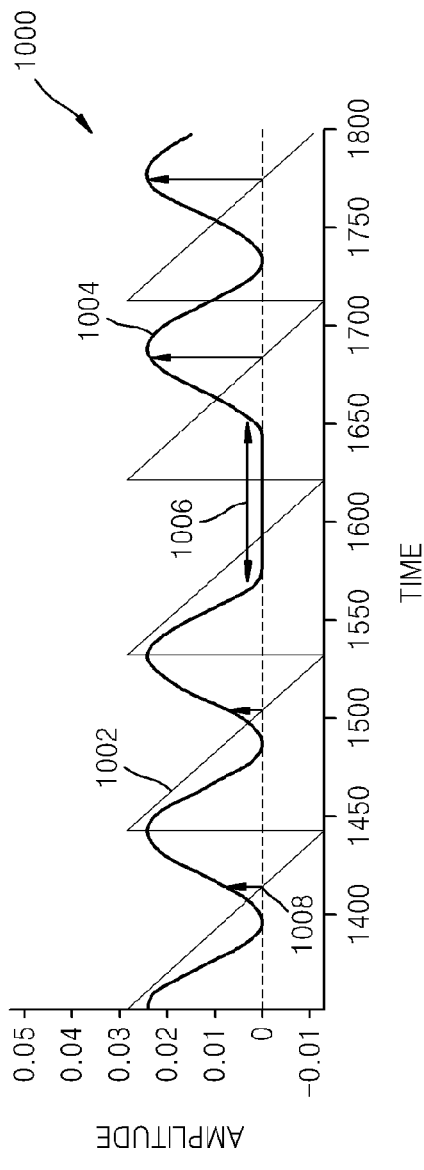
FIGS. 10A and 10B are schematic diagrams illustrating synchronization of a peak of each of a preamble signal with a sensitivity region of a super regenerative receiver (SRR)
Figure 10B:
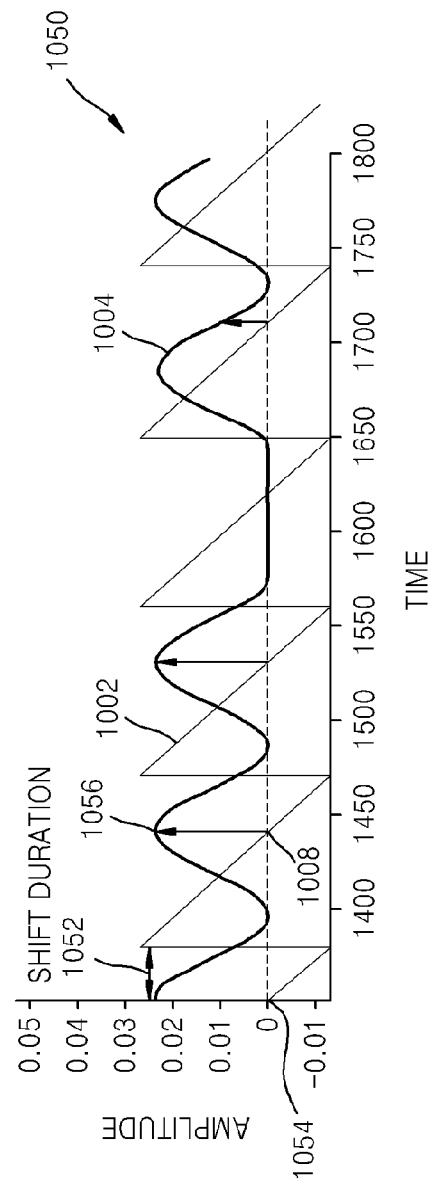

FIGS. 10A and 10B are schematic diagrams 1000 and 1050 illustrating synchronization of the peak of each of the preamble signal with the sensitivity region of the quench waveform. In FIG. 10A, the schematic diagram 1000 illustrates a correlation between an incoming baseband signal 1004 corresponding to a preamble signal, and a quench waveform 1002 having an OQR equal to 1. The incoming baseband signal 1004 includes an intermittent fractional shift 1006 between basic sequences of the preamble signal. Also, the quench waveform 1002 has a sensitivity region 1008 away from the peak of each pulse of the incoming baseband signal 1004.

Referring to FIG. 10B, the schematic diagram 1050 illustrates shifting of the quench waveform 1002 to synchronize the peak of each pulse of the preamble signal by a shift duration 1052 from a start index 1054. By shifting the quench waveform by the shift duration 1052, the peak of each pulse of the preamble signal synchronized with the sensitivity region of the receiver 102 is indicated by a reference numeral 1056.

Figure 11:
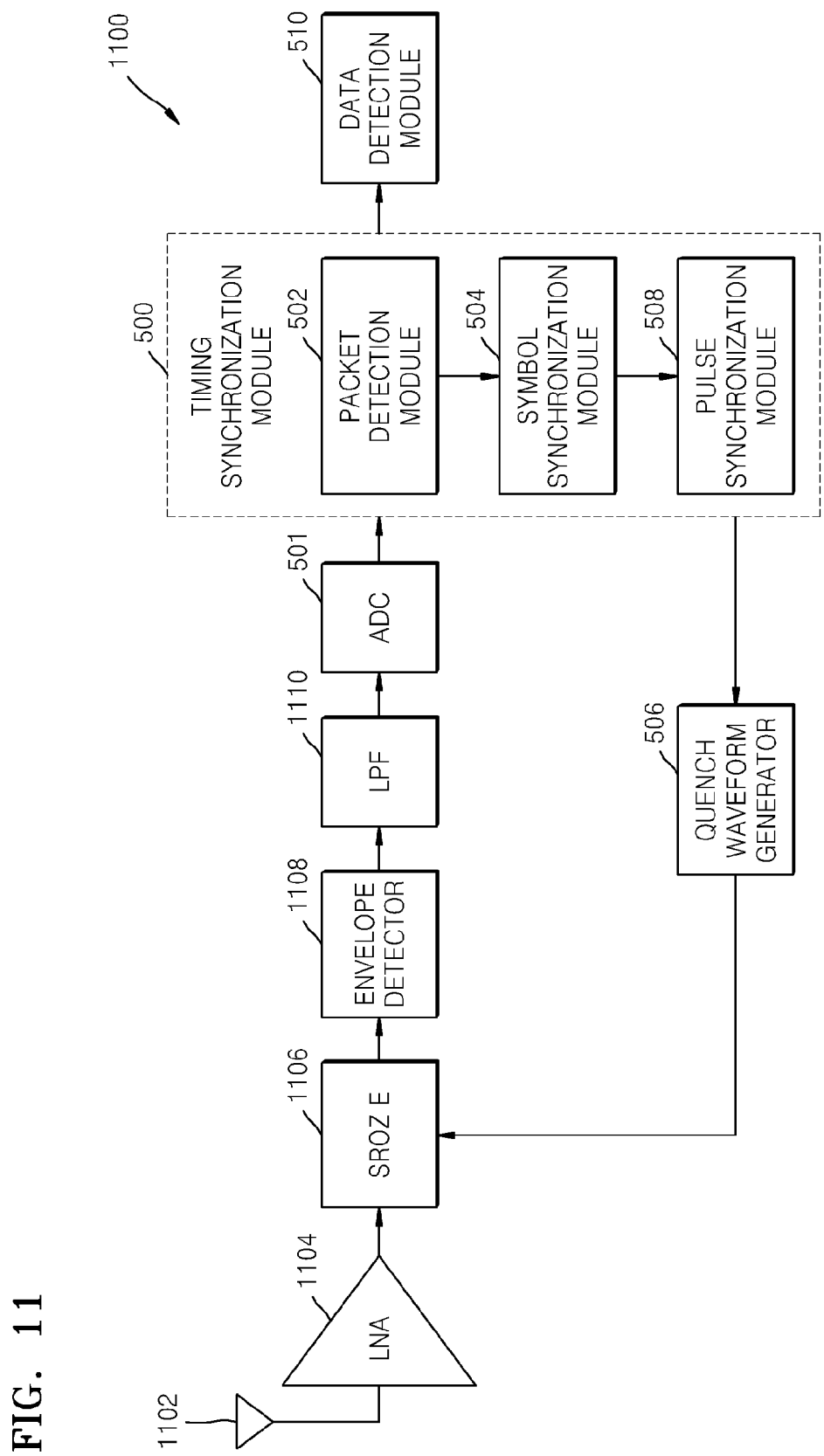
FIG. 11 is a block diagram of an SRR, according to an embodiment.

FIG. 11 is a block diagram of an SRR, according to an embodiment. The SRR 1100 is an embodiment of the receiver 102 of FIG. 1. The SRR 1100 includes an antenna 1102, a low noise amplifier (LNA) 1104, a super regenerative oscillator (SRO) 1108, an envelope detector (ED) 1108, a low pass filter (LPF) 1110, the ADC 501, the timing synchronization module 500, the quench waveform generator 506, and the data detection module 510.

As shown in FIG. 11, the timing synchronization module 500 connected to the ADC 501 detects a data packet in the air corresponding to a preamble signal, determines a start index of the preamble signal, and computes a shift in quench waveform so as to synchronize a peak of each pulse of an incoming baseband signal corresponding to the preamble signal with a sensitivity region of the SRR. A start index and a shift in the quench waveform are provided to the quench waveform generator 506 so that the SRO 1106 synchronizes the peak of each pulse of the remaining incoming baseband signal with the sensitivity region of the quench waveform. The components of the SRR 1100, such as the antenna 1102, the LNA 1104, the SRO 1106, the ED 1108, and the LPF 1100, are well-known to one of ordinary skill in the art and hence the description thereof will be omitted.

The elements described herein, for example, in FIGS. 2, 5, and 11, may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

It is to be understood that in the embodiment of the present invention, the operations in FIGS. 3 and 6-9 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 3 and 6-9.

Program instructions to perform a method described in FIGS. 3 and 6-9, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, comprising:
generating a preamble signal, wherein a peak of each pulse of the preamble signal is synchronized with a sensitivity region of a super regenerative receiver (SRR); and
transmitting, to the SRR, a data packet comprising the preamble signal, wherein the data packet is a baseband signal corresponding to the preamble signal,
wherein the preamble signal comprises blocks of synchronization sequences, each of the blocks of synchronization sequences comprising basic sequences with an intermittent fractional shift of a time duration between consecutive basic sequences.

2. The method of claim 1, wherein the generating of the preamble signal comprises:
generating a basic binary sequence,
repeating the generated basic binary sequence for a number of times,
converting the repetitive basic binary sequences into repetitive basic pulse sequences,
adding a first intermittent fractional shift between basic pulse sequences to obtain a block of synchronization sequence,
repeating the block of synchronization sequences for a number of times, and
adding a second intermittent fractional shift between blocks of synchronization sequences.

3. A method of operating a super regenerative receiver (SRR), the method comprising:
detecting a data packet based on a baseband signal corresponding to a preamble signal received from a transmitter;
setting a starting point of a first symbol of the preamble signal corresponding to the detected data packet; and
synchronizing a peak of each pulse of the preamble signal with a sensitivity region of the SRR by shifting a quench waveform from the starting point of the first symbol of the preamble signal by an estimated shift.

4. The method of claim 3, wherein the detecting of the incoming data packet comprises:
computing a correlation value by correlating the baseband signal with a basic sequence,
comparing the computed correlation value and a threshold value and outputting a comparison result, and
detecting the data packet based on the comparison result.

5. The method of claim 4, wherein the computing of the correlation value comprises:
computing a correlation value for each period in a basic sequence of the preamble signal, and
computing an average correlation value by averaging the computed correlation values corresponding to the periods in the basic sequence.

6. The method of claim 3, wherein the setting of the starting point comprises:
detecting a start frame delimiter (SFD) sequence of the baseband signal by computing a correlation value between the baseband signal and a SFD sequence, and
determining a symbol synchronization point by comparing the computed correlation value and a threshold value.

7. The method of claim 6, wherein the setting of the starting point further comprises:
determining, according to a comparison between the computed correlation value and the threshold value, an index value corresponding to a correlation value obtained by correlating the baseband signal with a basic sequence,
computing a set of correlation values using the index value,
identifying, from the computed set of correlation values, a correlation value that is greater than or equal to a threshold value, and
estimating a start index of the preamble signal based on a number of identified correlation values,
wherein the starting point of the first symbol of the preamble signal is set based on the estimated start index.

8. The method of claim 3, wherein the synchronizing of the peak of each pulse of the preamble signal comprises:
determining a status of a pulse synchronization flag, and processing, based on the status of the pulse synchronization flag, the data packet remaining after shifting a quench waveform by a period.

9. The method of claim 8, wherein the synchronizing of the peak of each pulse of the preamble signal further comprises:
obtaining an average sample for each of basic sequences of the preamble signal based on the status of the pulse synchronization flag,
computing a pulse offset error metric using the obtained average samples, and
estimating, based on the computed pulse offset error metric, a shift required in the quench waveform with respect to a start index of the preamble signal in order to synchronize the peak of each pulse of the preamble signal with the sensitivity region of the SRR,
wherein the peak of each pulse of the preamble signal is synchronized with the sensitivity region of the SRR based on the estimated shift.

10. The method of claim 7, wherein the synchronizing of the peak of each pulse of the preamble signal comprises:
identifying an index corresponding to a maximum correlation value from among the identified correlation values, and
estimating, based on the identified index, a shift required in a quench waveform with respect to a start index of the preamble signal in order to synchronize the peak of each pulse of the preamble signal with the sensitivity region of the SRR,
wherein the peak of each pulse of the preamble signal is synchronized with the sensitivity region of the SRR based on the estimated shift.

11. An apparatus, comprising:
a preamble signal generation module configured to generate a preamble signal, wherein a peak of each pulse of the preamble signal is synchronized with a sensitivity region of a super regenerative receiver (SRR); and
a transmitter configured to transmit, to the SRR, a data packet that comprises the preamble signal and is in a form of a baseband signal corresponding to the generated preamble signal,
wherein the preamble signal comprises blocks of synchronization sequences, each of the blocks of synchronization sequences comprising basic sequences with an intermittent fractional shift of a time duration between consecutive basic sequences.

12. The apparatus of claim 11, wherein the preamble signal generation module is configured to:
generate a basic binary sequence,
repeat the basic binary sequence for a number of times,
convert the repetitive basic binary sequences into repetitive basic pulse sequences,
add a first intermittent fractional shift between basic pulse sequences to obtain a block of synchronization sequences,
repeat the block of synchronization sequences for a number of times, and
add a second intermittent fractional shift between blocks of synchronization sequences.

13. A super regenerative receiver (SRR), comprising:
a packet detection module configured to detect a data packet based on a baseband signal corresponding to a preamble signal received;
a symbol synchronization module configured to set a starting point of a first symbol of the preamble signal corresponding to the detected data packet; and
a pulse synchronization module configured to synchronize a peak of each pulse of the preamble signal with a sensitivity region of the SRR by shifting a quench waveform from the starting point of the first symbol of the preamble signal by an estimated shift.

14. The SRR of claim 13, wherein the packet detection module is configured to:
compute a correlation value by correlating the baseband signal with a basic sequence,
compare the computed correlation value and a threshold value, and
detect the data packet based on a comparison result.

15. The SRR of claim 14, wherein the packet detection module is configured to:
compute a correlation value for each period in a basic sequence of the preamble signal, and
compute an average correlation value by averaging the computed correlation values corresponding to the periods in the basic sequence.

16. The SRR of claim 13, wherein the symbol synchronization module is configured to:
detect a start frame delimiter (SFD) sequence of the baseband signal by computing a correlation value between the baseband signal and a SFD sequence, and
determine a symbol synchronization point by comparing the correlation value and a threshold value.

17. The SRR of claim 16, wherein the symbol synchronization module is configured to:
determine, according to a comparison between the computed correlation value and the predetermined threshold value, an index value corresponding to a correlation value obtained by correlating the baseband signal with a basic sequence,
compute a set of correlation values by using the index value,
identify, from the set of correlation values, a correlation value that is greater than or equal to a threshold value,
estimate a start index of the preamble signal based on a number of identified correlation values, and
set the starting point of the first symbol of the preamble signal based on the estimated start index.

18. The SRR of claim 13, wherein the pulse synchronization module is configured to:
determine a status of a pulse synchronization flag, and
process, based on the status of the pulse synchronization flag, the data packet remaining after shifting a quench waveform by a period.

19. The SRR of claim 18, wherein the pulse synchronization module is configured to:
obtain an average sample for each of basic sequences of the preamble signal based on the status of the pulse synchronization flag,
compute a pulse offset error metric by using the obtained average samples,
estimate, based on the computed pulse offset error metric, a shift required in the quench waveform with respect to a start index of the preamble signal in order to synchronize the peak of each pulse of the preamble signal with the sensitivity region of the SRR, and
synchronize the peak of each pulse of the preamble signal with the sensitivity region of the SRR based on the estimated shift.

20. The SRR of claim 17, wherein the pulse synchronization module is configured to:
identify an index corresponding to a maximum correlation value from among the identified correlation values,
estimate, based on the identified index, a shift required in a quench waveform with respect to a start index of the preamble signal in order to synchronize the peak of each pulse of the preamble signal with the sensitivity region of the SRR, and synchronize the peak of each pulse of the preamble signal with the sensitivity region of the SRR based on the estimated shift.

* * * * *